United States Patent [19]

United States Patent [19]
Heeter

[11] Patent Number: 5,878,155
[45] Date of Patent: Mar. 2, 1999

[54] METHOD FOR VERIFYING HUMAN IDENTITY DURING ELECTRONIC SALE TRANSACTIONS

[76] Inventor: Thomas W. Heeter, 55 Lyerly, Houston, Tex. 77022

[21] Appl. No.: 709,471

[22] Filed: Sep. 5, 1996

[51] Int. Cl.$^6$ ............................................. G06K 9/00
[52] U.S. Cl. ................................................. 382/115
[58] Field of Search ................................ 382/115, 116, 382/124–127, 100, 128, 133; 348/77, 15, 161; 209/3.3, 555; 356/71; 340/825.34; 235/379, 380, 382

[56] References Cited

U.S. PATENT DOCUMENTS

| | | | |
|---|---|---|---|
| 3,584,958 | 6/1971 | Miller et al. ......................... | 382/126 |
| 4,597,495 | 7/1986 | Knosby ................................ | 209/3.3 |
| 4,805,223 | 2/1989 | Denyer ................................ | 382/127 |
| 4,995,086 | 2/1991 | Lilley et al. ....................... | 382/124 |
| 5,633,947 | 5/1997 | Sibbald .............................. | 382/124 |

*Primary Examiner*—Christopher S. Kelley
*Attorney, Agent, or Firm*—John R. Casperson

[57] ABSTRACT

A method is presented for facilitating sales transactions by electronic media. A bar code or a design is tattooed on an individual. Before the sales transaction can be consummated, the tattoo is scanned with a scanner. Characteristics about the scanned tattoo are compared to characteristics about other tattoos stored on a computer database in order to verify the identity of the buyer. Once verified, the seller may be authorized to debit the buyer's electronic bank account in order to consummate the transaction. The seller's electronic bank account may be similarly updated.

10 Claims, 3 Drawing Sheets

METHOD FOR VERIFYING HUMAN IDENTITY DURING ELECTRONIC SALE TRANSACTIONS

BACKGROUND OF THE INVENTION

1. Field of the Invention

The present invention relates to the identification of humans. More particularly, the present invention relates to the application of invisible, indelible tattoos on humans for purposes of identification in order to conduct monetary and credit transactions in a secure manner.

2. Description of the Related Art

The advent of computer networks, particularly computer networks owned by financial institutions, has created the ability to conduct point-sale transactions in unforseen ways. While credit cards have been in use for many years, new forms of cards are appearing that take the place of paper money. This new form of cash, commonly called "e-money," is placed onto a card with a magnetic strip, much like a credit card. Unfortunately, as with credit cards, e-money can be stolen. However, unlike credit cards, e-money can be used by the thief with relative impunity because e-money, as with regular cash, is not registered as "owned" by anyone.

In order to facilitate the identification of humans, governments have issued cards and papers with the names and photographs of the person to which the card or paper is issued. An example of such a card or paper is the common drivers license or passport. However, as with credit cards and e-money, the drivers license or passport can be lost or stolen. In addition, phoney identification cards can be made by unscrupulous individuals. There are, however, systems for verifying use of a credit or identification card. Such a system is described in U.S. Pat. No. 5,513,272 to Bogosian, herein incorporated by reference for all purposes. The Bogosian system uses fingerprint and voice print matching to verify the identity of the card holder. Unfortunately, this dual matching is subject to problems, particularly when the card holder has a cold or other respiratory infection that affects speech patterns.

There have been other methods to permanently identify humans. During the holocaust, the Nazis tattooed the arms of Jews with a unique identifying number. On an episode of the "X-FILES," a fictional television program on the FOX television network, a human was abducted by aliens who conducted experiments on the abductee. In order to permanently tag the abductee, the aliens etched a unique bar code onto one of the abductee's teeth. Neither of these methods is practical for marking humans for electronic sale transaction purposes. First, social conscience dictates that any permanent marking of humans not be conspicuous, such as a visible numbering on an arm like the holocaust victims. Second, the bar code must be long enough, large enough, and accessible enough to make the transaction efficient. Thus bar codes on teeth would not be practical because of the limited size of the teeth and the embarrassment caused by sales personnel placing scanning equipment in a customer's mouth.

There is, therefore, a need in the art for verifying the identity of humans by electronic means that facilitates the transaction of sales, particularly e-money, through computer networks. It is an object of the present invention to overcome problems in the prior art.

SUMMARY OF THE INVENTION

The present invention solves the problems inherent in the prior art. A unique bar code or a unique design is tattooed with invisible ink on an individual. The tattoo can be either temporary or permanent and can be on any convenient portion of the person's anatomy, preferably the forearm. When the individual desires to make a sales transaction, the tattoo is scanned with a scanner. Characteristics about the tattoo are then compared to characteristics about other tattoos stored on a computer database. If the scanned characteristics match those on the database, then the person is identified and the seller will be authorized to debit the buyer's electronic bank account (assuming the buyer has sufficient funds). Unlike credit cards or identity papers, a tattoo cannot be easily lost or stolen.

DESCRIPTION OF THE PREFERRED EMBODIMENT

Figure 1:
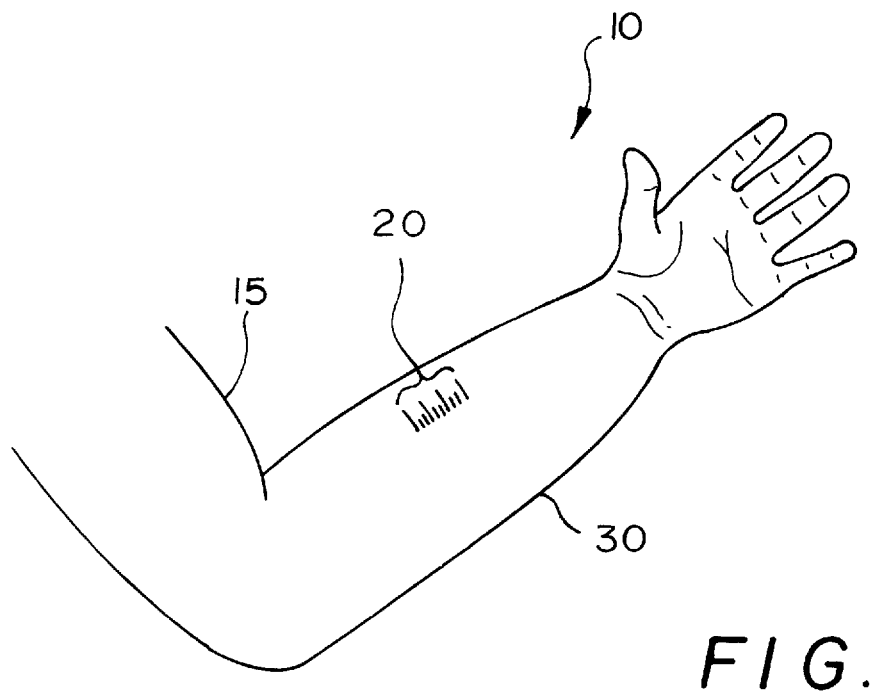
FIG. 1 shows a tattoo on a human forearm of the identification system of the present invention.

As shown in FIG. 1, a tattoo 20 is applied to an appendage 30 of the wearer 15. In the preferred embodiment, an invisible, indelible ink would be used. A suitable ink would be "INVISIBLE SKIN MARKING INK #743" which is manufactured by Sirchie Finger Print Laboratories, 100 Hunter Place, Youngsville, N.C.

The tattoo 20 itself can be of any convenient shape or size. The invention works best when the tattoo is unique because no other means of identification are necessary. Although an invisible ink could be used, the invention would work equally well with a tattoo that is visible to the human eye.

In such an instance, a decorative design tattoo may be preferred by the wearer 15. Although in the preferred embodiment the tattoo 20 is permanent, the invention would work equally well with a temporary tattoo that made with removable ink. Furthermore, if the individual 15 does not wish to wear the tattoo 20, he or she may have the design or bar code placed on another medium, such as the skin adhesive material used for securing EKG leads. Suitable skin adhesive material is made by the Bard Parker Company. The tattoo 20 is placed on the skin adhesive material which, in turn, is placed on the wearer 15.

Figure 3:
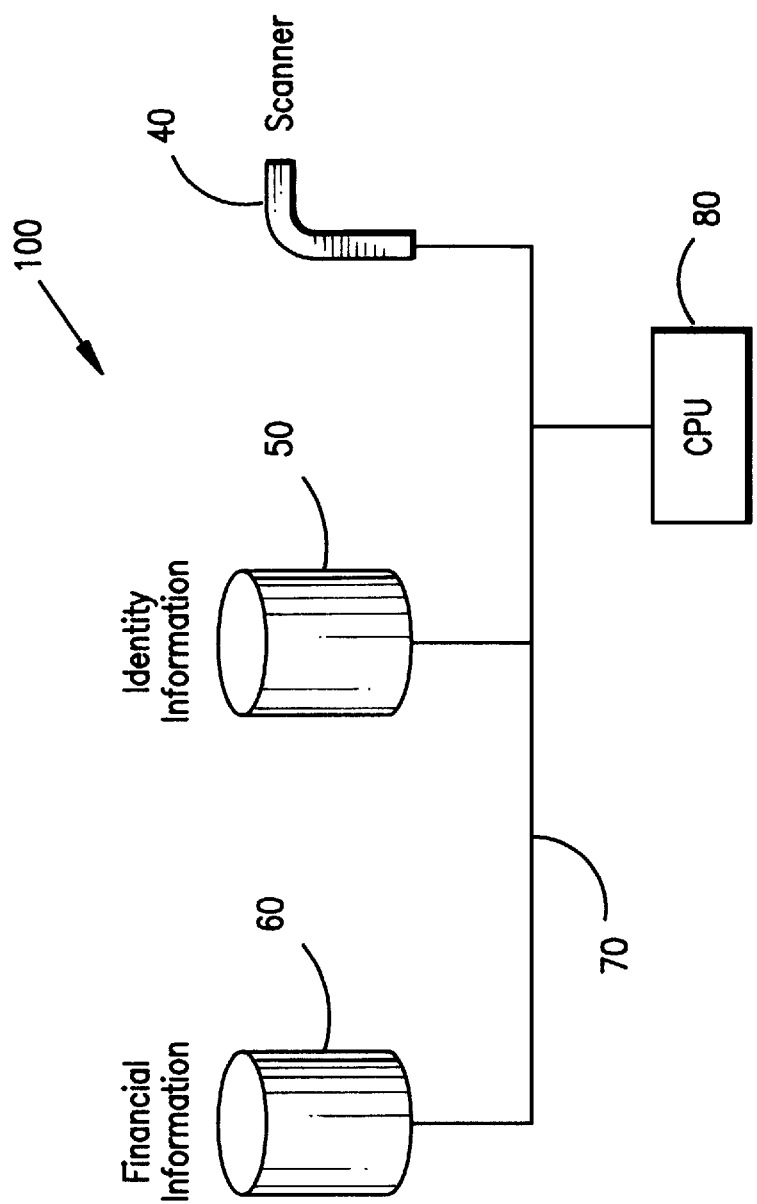
FIG. 3 shows a computer network of the identification system of the present invention.

Aside from tattoos, the present invention also comprises a computer network 100 as shown in FIG. 3. Tattoo 20 characteristics are stored with the wearer's name, address, etc. in the identity database 50. Financial information about the wearer 15 is stored in a financial information database 60 that is part of the network 100. If necessary, the characteristics of the tattoo 20 can be combined with the financial information in the financial database 60, eliminating the need for a separate identity database 50 and allow the wearer 15 to remain anonymous during a commercial transaction. A suitable storage medium for the identity database 50 and the financial database 60 is a common tape drive or a hard disk drive. One or more scanners 40, and one or more central processing units (CPU) 80 are also attached to the network 100. The CPU 80 is used to compare scanned tattoo 20 characteristics with the tattoo 20 characteristics stored in the identity database 50. A suitable CPU is a microprocessor such as the "PENTIUM" made by Intel Corporation. If the tattoo 20 is visible to the naked eye, then any common scanner is suitable for the present invention. If invisible ink is used for the tattoo 20, then a scanner capable of emitting Type A ultraviolet light (UV-A) must be used. Under UV-A, the "invisible" tattoo appears as a brilliant white with human skin appearing as dark, providing a useful contrast for scanning purposes. However, standard scanners are designed to detect dark markings on a light background. For the scanner to read a "negative" bar-code, outside light must be minimized. Fortunately, these low-light conditions can be obtained easily by using an opaque covering on the scanning device.

The characteristics of the tattoo 20 can be combined with the wearer's fingerprint characteristics as well as the wearer's name, address, social security number, and any other desired information and stored on the identity database 50 as shown in FIG. 3. The name of the wearer/purchaser's financial institution, as well as current account information, are stored in the financial database 60. Once the wearer 15 has deposited sufficient funds with the financial institution, and once the identity database 50 and the financial database 60 are updated, the wearer 15 is able to conduct electronic sales transactions. After a tattoo 20 has been placed onto an appendage 30 of the wearer 15 as shown in FIG. 1, the wearer 15 is ready to practice the present invention.

All of the scanners 40, CPUs 80, as well as the identity database 50 and financial database 60 are linked together by a common databus 70 to form the network 100 as shown in FIG. 3.

Figure 2:
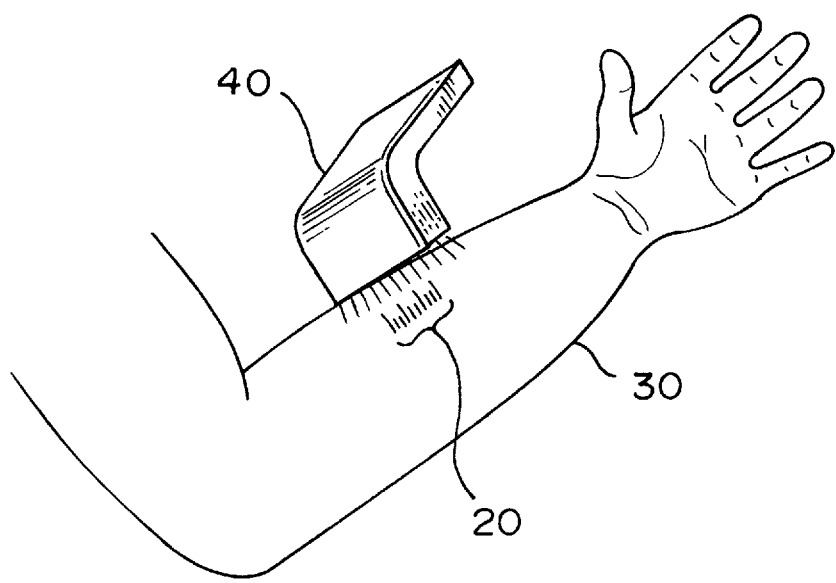
FIG. 2 shows a scanner scanning a tattoo of the identification system of the present invention.
Figure 4:
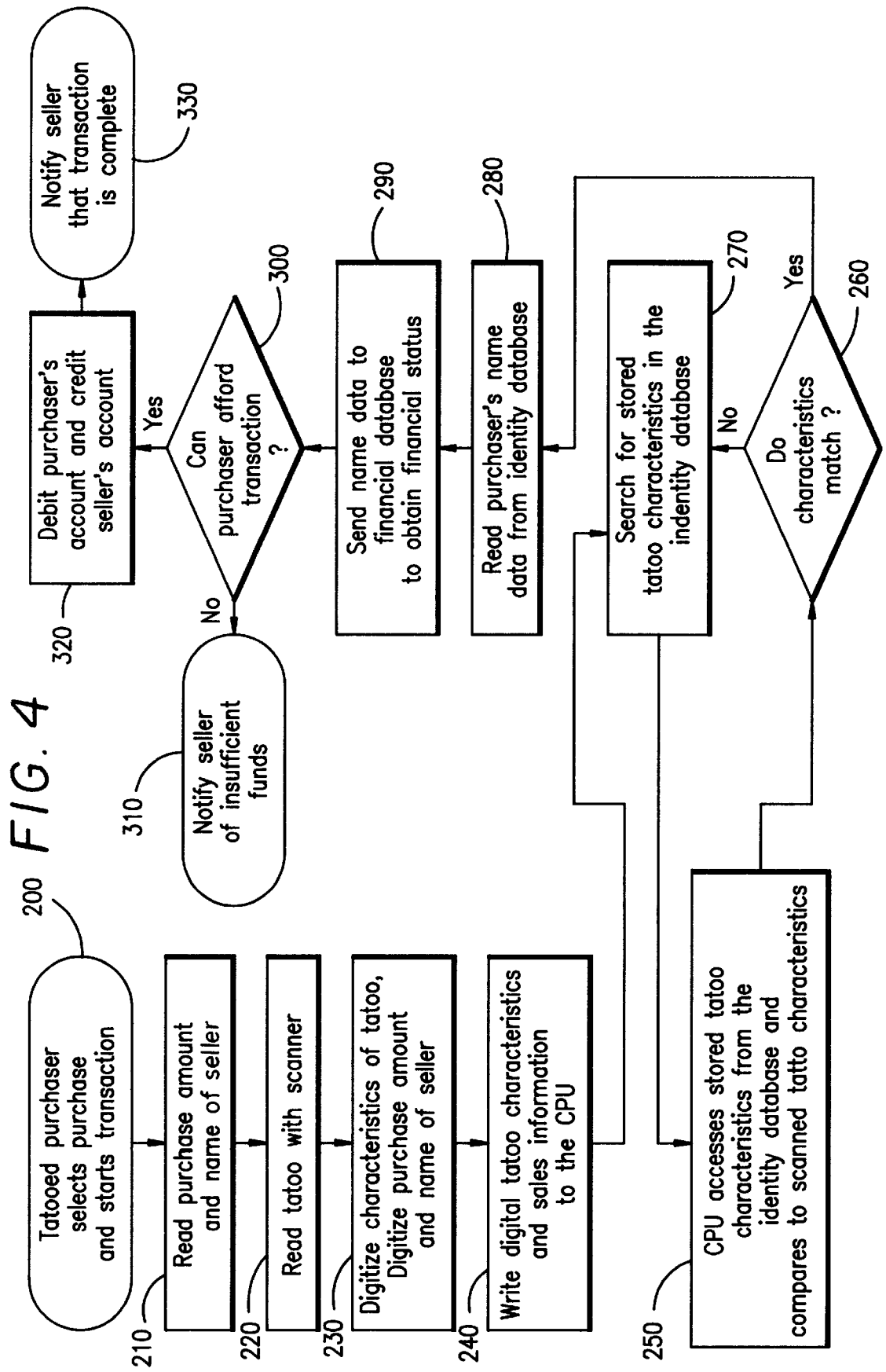
FIG. 4 is a flowchart illustrating a method of operation of the present invention.

The preferred method of operation, as shown in FIG. 4, is as follows:

In step 200 of FIG. 4, the purchaser selects an item for sale and initiates the sales transaction. In step 210, after the purchaser has made his/her selection, the seller's agent first scans the bar code on the article being sold in order to load information about the article and the seller for inventory and cost purposes. Next, in step 220, the tattoo 20 is scanned by scanner 40 as shown in FIG. 2. If additional identification is deemed necessary, the wearer's fingerprints may also be scanned. In step 230 of FIG. 4, the scanner 40 digitizes the image of the tattoo 20 and the purchase-cost/seller-identity information.

The scanned characteristics about the tattoo 20 and the purchase/seller information are is sent (or in computer parlance "written") from the scanner 40 to the CPU 80 via network databus 70 as shown in step 240 of FIG. 4. The CPU 80 then searches the identity database 50 for stored characteristics about tattoos in step 270. In step 250, the CPU accesses the stored characteristics of tattoos found in the identity database 50 and then compares them to the scanned characteristics of the tattoo 20. In step 260, it is determined whether or not the scanned characteristics match the stored characteristics stored in the identity database 50. If a match does not occur, step 270 and step 250 are repeated until a match is found or the scanned characteristics have been compared to all of the available stored characteristics in the identity database 50. If a match is never found, the sales transaction can be canceled. However, if a match is found, the identity of the wearer 15 can be provided to the seller because the purchaser's identity is linked to the stored characteristics of the tattoo 20 stored in the identity database 50 as shown in step 280 of FIG. 4. The seller, or, in the alternative, the simple matching and consequent identity verification, can trigger CPU 80 to query the financial database 60 to determine if the wearer 15 has sufficient funds to consummate the sales transaction as shown in step 290 of FIG. 4. If the data in the financial database 60 confirms that the wearer 15 has sufficient funds (step 300), then the sales transaction can be consummated. If the purchaser does not have sufficient funds, the seller can be so notified in step 310. Once the sale is consummated, the CPU 80 can be instructed to modify the wearer's 15 account information in the financial database 60 to reflect the results of the sales transaction as shown in step 320 of FIG. 4. Finally, the seller's account information on the financial database 60 can also be modified to reflect the results of the sales transaction as shown in step 330 of FIG. 4.

The forgoing is a description of the arrangement and the operation of an embodiment of the present invention. The scope of the present invention is considered to include the described embodiment together with others obvious to those skilled in the art.

What is claimed is:

1. A method of human identification to facilitate electronic sale transactions comprising the steps of:

providing identity information about a purchaser on a storage medium, providing skin marking invisible ink, applying said invisible ink to an appendage of said purchaser to form a tattoo on said purchaser, storing characteristics about said tattoo on said storage medium to form stored characteristics about said tattoo, and linking said identity information about said purchaser to said stored characteristics about said tattoo.

2. A method of human identification as in claim 1 further comprising the steps of:

providing financial information about said purchaser on said storage medium, and linking said financial information about said purchaser to said identity information about said purchaser.

3. A method of human identification as in claim 1 further comprising the steps of:

providing financial information about said purchaser on said storage medium, and linking said financial information about said purchaser to said stored characteristics about said tattoo.

4. A method of human identification as in claim 2 further comprising the steps of:

scanning said tattoo on said purchaser with a scanning device to obtain scanned characteristics of said tattoo on said purchaser, comparing said scanned characteristics to characteristics about other tattoos found on said storage medium in order to determine if said scanned characteristics match said stored characteristics about said tattoo on said purchaser stored on said storage medium, and only if said scanned characteristics match said stored characteristics then providing said linked identity information in order to verify the identity of said purchaser.

5. A method of human identification as in claim 4 further comprising the step of:

only if said scanned characteristics match said stored characteristics then providing said linked financial information in order to verify that said purchaser has sufficient funds to consummate a sales transaction.

6. A method of human identification as in claim 5 further comprising the step of:

only upon verification that said purchaser has sufficient funds to consummate said sales transaction then modifying said stored financial information about said purchaser to reflect a consummated sales transaction.

7. A method of human identification as in claim 3 further comprising the steps of:

scanning said tattoo on said purchaser with a scanning device to obtain scanned characteristics about said tattoo, comparing said scanned characteristics to characteristics about tattoos stored found on said storage medium in order to determine if said scanned characteristics match said stored characteristics of said tattoo on said purchaser stored on said storage medium, and only if said scanned characteristics match said stored characteristics then providing said linked financial information in order to verify that said purchaser has sufficient funds to consummate a sales transaction.

8. A method of human identification as in claim 7 further comprising the step of:

only upon verification that said purchaser has sufficient funds to consummate said sales transaction then modifying said stored financial information about said purchaser to reflect a consummated sales transaction.

9. A method of human identification as in claim 5 further comprising the steps of:

providing financial information about a seller on said storage medium, and only upon verification that said purchaser has sufficient funds to consummate said sales transaction then modifying said stored financial information about said seller to reflect a consummated sales transaction.

10. A method of human identification as in claim 7 further comprising the steps of:

providing financial information about a seller on said storage medium, and only upon verification that said purchaser has sufficient funds to consummate said sales transaction then modifying said stored financial information about said seller to reflect a consummated sales transaction.

\* \* \* \* \*